April 7, 1931.  J. O. ALLSTOTT  1,800,003
FEED MIXER
Filed Aug. 13, 1927  2 Sheets-Sheet 1
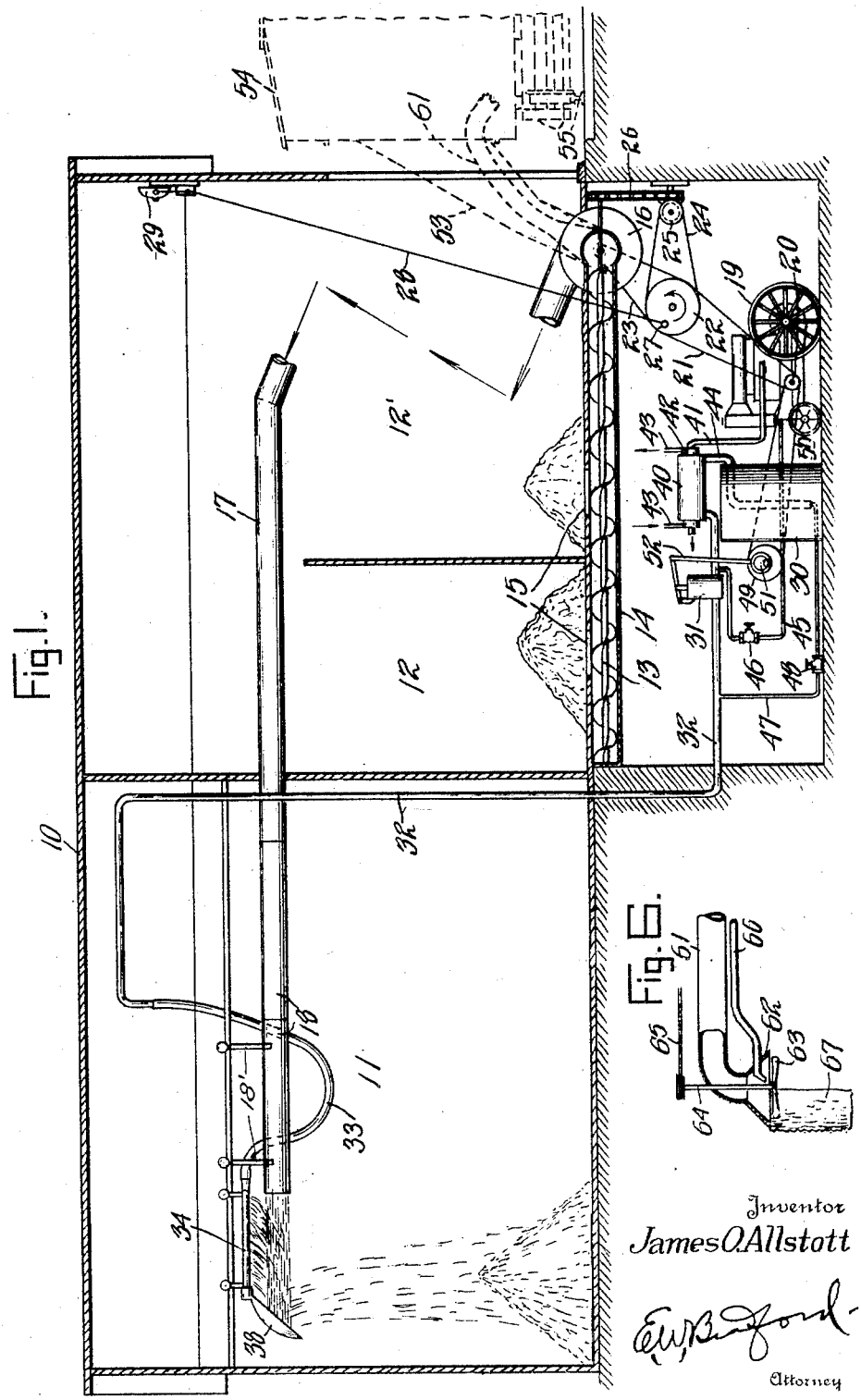
Inventor
James O. Allstott
Attorney April 7, 1931. J. O. ALLSTOTT 1,800,003
FEED MIXER
Filed Aug. 13, 1927 2 Sheets-Sheet 2
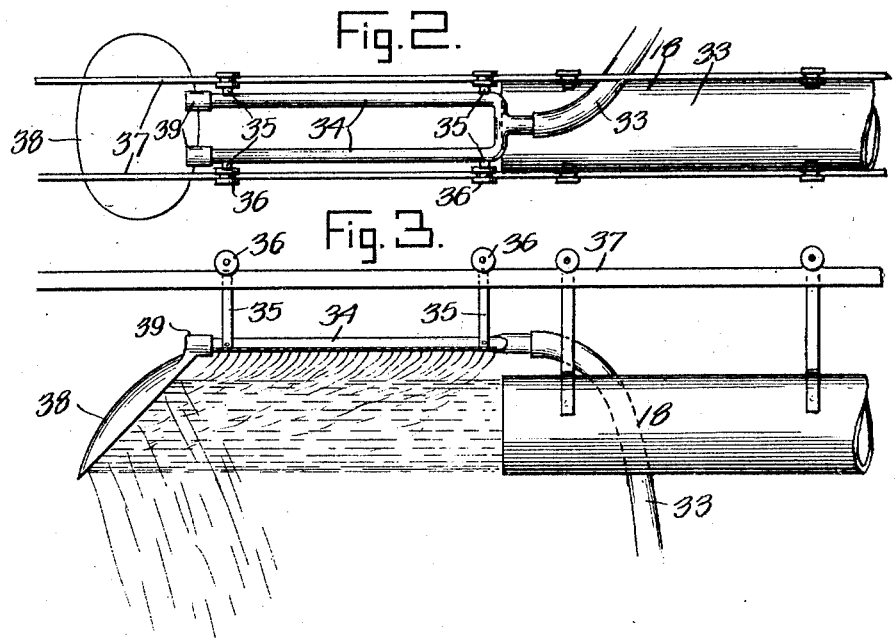
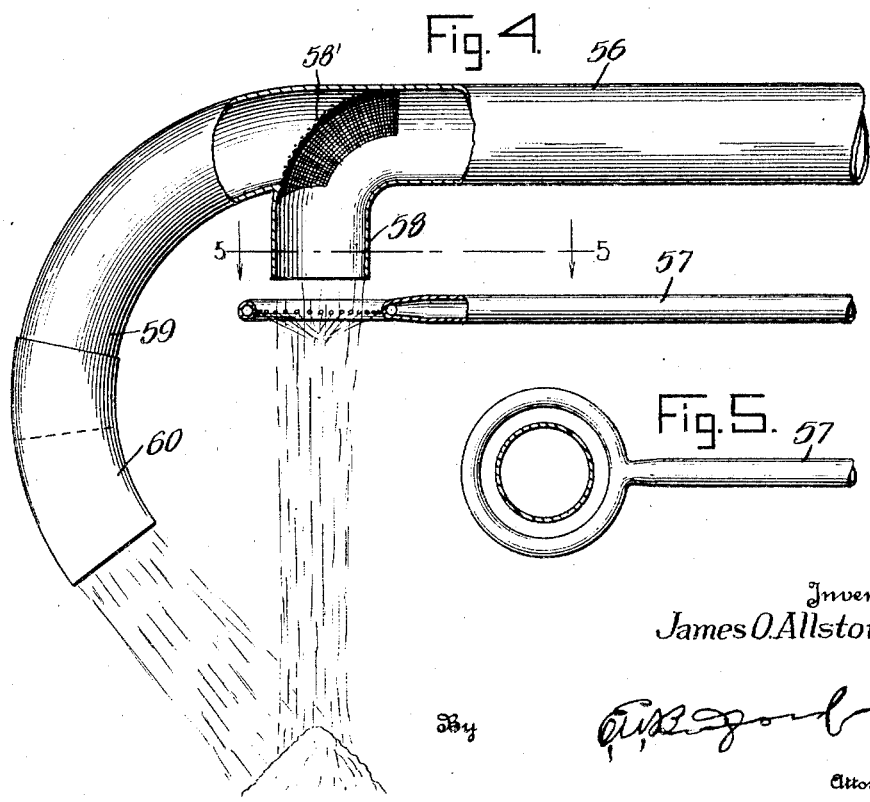
Inventor
James O. Allstott
By
Attorney Patented Apr. 7, 1931

1,800,003

UNITED STATES PATENT OFFICE

JAMES O. ALLSTOTT, OF PAOLI, OKLAHOMA

FEED MIXER

Application filed August 13, 1927. Serial No. 212,745.

My invention relates to a molasses feed mixer for mixing molasses, sirup, or other edible fluent material with comminuted feed of various kinds for preparing a balanced ration for stock similar to that shown in my Patent No. 1,580,988 of April 13, 1926, and it is an object of the invention to provide mechanism for rapidly, uniformly and efficiently mixing the ingredients in a storage room, such as, for example, a barn loft, bin, or the like, so that the mixed feed may be stored away for future use without further handling, thereby preventing loss of material in handling, saving labor, and the cost of handling, all as will be hereinafter more particularly described and claimed.

Referring to the accompanying drawings which are made a part hereof and in which similar reference characters indicate similar parts, Figure 1 is a longitudinal section of a barn illustrating one application of my invention, Figure 2, a detail top plan view of the end of the conveyor and the molasses supplying nozzle associated therewith, Figure 3, a side elevation of the same, Figure 4, a side elevation partly in section of a modified form of the discharge end of the conveyer and molasses supplying nozzle, Figure 5, a section on the line 5—5 of Fig. 4, and Figure 6, a further modified mixing head.

In the drawings reference character 10 indicates a barn or the like having a room 11 for the storage of mixed feed and rooms 12 and 12' in which the ingredients, such as cotton seed hulls, ground or finely chopped, alfalfa hay, cotton seed meal, corn meal, linseed meal, etc. are placed prior to their being commingled. If desired, the coarse feed, including finely chopped hay and hulls, may be kept in one of the rooms apart from the finer grain or meal feeds.

Beneath the floor of the rooms 12 and 12' is disposed a conveyor 13 of the screw or auger type which is mounted in a sheet metal trough 14 or the like and into which the different materials to be mixed are deposited through openings 15 provided with shutters or sliding doors, not shown. A fan blower 16 is mounted at one end of the trough 14 in communication therewith and is arranged to receive the materials deposited in the trough and to force the same in a thoroughly commingled condition through the conveyor tube 17 into the storage room 11. The end of the tube 17 is provided with a plurality of adjustable sections 18 in order to permit the sections to be removed and the material deposited across the storage room in more than one pile, the adjustable sections 18 being suspended by means of hangers 18'.

Any desired means may be employed for operating the screw conveyor 13 and fan blower 16. However, in the present instance, I have shown a tractor 19 for furnishing the necessary power. Said tractor 19 is provided with a pulley 20 which by means of a belt 21 drives a pulley 22 from which a belt 23 drives the fan blower 16. Also a belt 24 operates a pulley 25 which operates by means of bevel gears, not shown, a sprocket chain 26 which drives a sprocket mounted on the screw conveyor 13. The pulley 22 is provided with an eccentric 27 having connection 28 with a bell or other audible signal 29 so that such audible signal is operated at regular intervals by the rotation of the pulley 22 upon the operation of the screw conveyor and the fan blower. By manual means the ingredients are fed into the machine upon certain signal produced by the bell 29 in order that a proper uniform mixture is obtained.

Raw black strap molasses or other sweet sirup is preferably contained in a reservoir or tank 30 from which it is drawn by a pump 31 and forced through a pipe 32, rubber hose 33 and through a perforated discharge nozzle 34. The discharge nozzle 34 is mounted in substantially parallel relation to the discharge end of the conveyor 17 beyond the extremity of the same so that the molasses or other sirupy material will be deposited upon the mixed feed as it is discharged into the storage room. The perforated discharge nozzle 34 comprises a pair of spaced parallel pipes supported by means of arms 35 and rollers 36 upon a pair of parallel tracks 37 along which the nozzle may be moved when certain of the sections 18 are added or removed.

In order to deflect the comminuted commingled materials discharged from the end of the pneumatic conveyor, after they are coated with the sirupy material ejected from the nozzle 34, I provide a deflector 38 which comprises a curved substantially oval-shaped member provided with sockets 39 which fit over the ends of the arms of the nozzle 34.

In order to heat the sirup so that it will flow more readily, I provide a casing 40 through the center of which extends the exhaust pipe 41 about which is disposed a water jacket 42 through which water circulates through pipes 43 for preventing the sirup from burning. Molasses or sirup is allowed to flow about the water jacket 42 in the casing 40 from a pipe 44 which extends into the reservoir 30 and from which jacket the molasses is discharged into a conduit 32. In order to dilute or thin the molasses, I provide a pipe 45 having one end in communication with the radiator of the tractor and having its other end connected to the pipe 32 on the inlet side of the pump, such pipe being provided with a valve 46 by means of which the amount of hot water supplied to the molasses may be controlled. In order to accommodate excessive diluted or thinned molasses, I provide a pipe 47 which connects one end of the pipe on the discharge side of the pump with the molasses tank 30. The end of the pipe 47 which is disposed in the tank 30 extends a slight distance into the pipe 44 so that the diluted molasses will not be deposited in the tank 30 but will pass through the tank and pipe 44 and will again be drawn out by the pump 31 and discharged into the pipe 32. A safety or pop off valve 48 is placed in the line 47 which valve may be set to operate at the desired pressure so that the output of the pump may be controlled and excess pressure in the pipe 32 will be relieved and excess sirup will be returned to the tank 30.

Any desired means may be employed for operating the pump 31. However, in the present instance I have shown a pulley 49 operated by a belt 50 from the tractor pulley 20, said pulley being provided with an eccentric 51 having a connector 52 with the pump 31.

In the operation of the device above described, the machinery being set in motion, the rotation of the pulley 22 and the eccentric 27 will cause the audible signal 29 to sound at regular intervals whereupon the valve 48 being adjusted so that the pump 31 will supply the desired amount of sirup, as for example four pounds per twelve taps of the bell 29, the proper amounts of fine grain feed and coarse hay feed may be deposited in the trough 14. I have found that sixteen pounds of fine feed to sixty pounds of coarse feed and four pounds of sirup make a good feed. The materials deposited in the trough 14 are carried by means of the air blower 16 through the conveyor tube 17 and are discharged against the deflector 38. At the same time molasses, sirup or other edible fluent material is drawn from the tank 30 through the pipe 44 into the jacket 40 about the insulated exhaust pipe 41 where it is heated and discharged into the pipe 32. The said fluent material is next supplied with hot water from the radiator of the tractor through the pipe 45. It then passes into the pump 31 and is forced into the pipe 32 from which it is forcibly ejected through the openings in the nozzle 34 in substantially the path of the feed discharged from the end of the conveyor. The impregnated mixed feed is caused by the deflector to fall on the floor of the storage bin where it is deposited in conical piles according to the position of the discharge nozzle 34 and the extremity of the conveyor tube.

The air blower 16 may be provided with a chute 53 into which food stuff may be directly deposited from a railway car 54 upon a track 55 alongside the rooms 12 and 12″. Instead of the chute 53 a suction pipe 61 may be connected with the blower 16 and used for sucking the feed from the entire length of the car. The suction pipe may be considered preferable since in rainy weather it may be used without getting the feed wet. This will not require the use of the conveyor 13 and the belt 24 may be removed.

In lieu of the extremity of the tube 18 an extremity 56 with a curved discharge end 59, as shown in Fig. 4, may be provided and the fluent edible material may be supplied through a nozzle 57. The conveyor 56 is provided with a discharge elbow 58 which has its outer end disposed at substantially right angles to the conveyor so that the coarse feed will be discharged through the elbow and across the circular nozzle 57 and receive its coating of molasses from said nozzle. A reticulated screen 58′ is provided at the curved outer portion of the elbow 58 and a curved section 59 forms a continuation of the conveyor 56 so that fine material passing through the reticulated screen 58′ may be discharged. On the end of the pipe 59 is adjustably mounted a discharge sleeve 60 which is curved to cause the fine material passing through the pipe 59 to be discharged into the path of the material coming through the discharge elbow 58 on top of the pile upon the floor of the storage chamber. This construction is particularly adapted for the mixing and coating of cotton seed cake with any suitable fine ground feed, such as cotton seed meal, the cake being discharged through the elbow 58 and being coated with sirup from the nozzle 57 while the fine powdered feed passes through the screen 58′ and elbow 60 and strikes the sirup coated cake near the pile on the floor. The cake thus coated may be moved with a shovel, placed in sacks or the like without sticking thereto.

Also in lieu of the structure shown in Figs. 2 and 4, the end of the conveyor tube, as shown in Fig. 6, may be provided with a member 61 having a flared extremity 62 at the mouth of which is disposed a four blade fan 63 mounted upon the shaft 64 operated by a belt 65 from any desired source of power. Molasses or other sirup is supplied through a pipe 66 directly over the fan 63 so that when the feed is discharged through the pipe 61 it will be thoroughly commingled and impregnated with the same. This structure is particularly designed for mixing cake and corn chops with molasses and water so that the mixture will ferment and form an excellent wet mixture for feeding steers while they are running on a grass pasture. A curtain 67 is provided for deflecting the finer particles for causing them to be deposited upon the floor of the storage chamber.

It will be obvious to those skilled in the art that various changes may be made in my device without departing from the spirit of the invention, and I, therefore, do not limit myself to what is shown in the drawings and described in the specification, but only as set forth in the appended claims.

Having thus fully described my said invention, what I claim as new and desire to secure by Letters Patent, is:

1. The combination of a storage room, an air blast conveyor for discharging fluent solid edible material into said storage room, means for projecting edible liquid in the path of the current of air and commingled feed as they leave the conveyor, and a curving oval-shaped member for deflecting the material discharged through said conveyor, substantially as set forth.

2. The combination of a conveyor, means for forcibly discharging material from said conveyor, means for supplying a fluent edible substance to said material, and a curving oval-shaped member for deflecting the material discharged from said conveyor, substantially as set forth.

3. The combination of a conveyor, means for forcibly discharging material from said conveyor, means for supplying a fluent edible substance to said material as it is discharged from the said conveyor, and adjustable means for deflecting the material discharged to permit a distribution of the discharged product, substantially as set forth.

4. In a feed mixing machine having a feed conveyor, a fluid motor for operating the conveyor, means for supplying a quantity of sirup to the mixed feed, means for maintaining the sirup in a fluent condition comprising a water jacket about the exhaust pipe from the fluid motor, and means for circulating sirup in contact with said jacket, the water jacket serving to prevent contact of the sirup with the exhaust pipe from the fluid motor to prevent burning the sirup, substantially as set forth.

In witness whereof, I have hereunto set my hand at Paoli, Oklahoma, this 30th day of July, A. D. nineteen hundred and twenty-seven.

JAMES O. ALLSTOTT.